Patented Apr. 24, 1928.

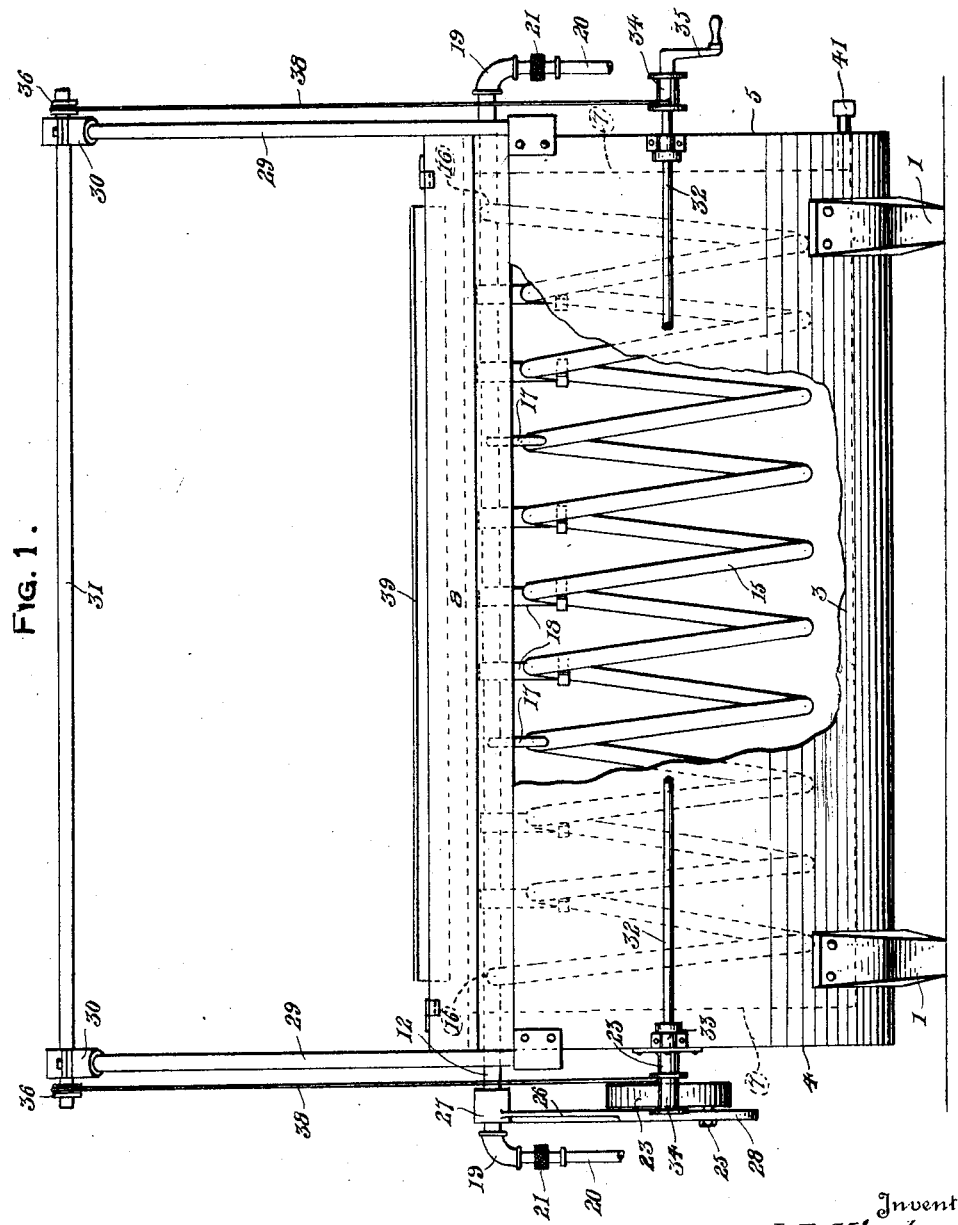

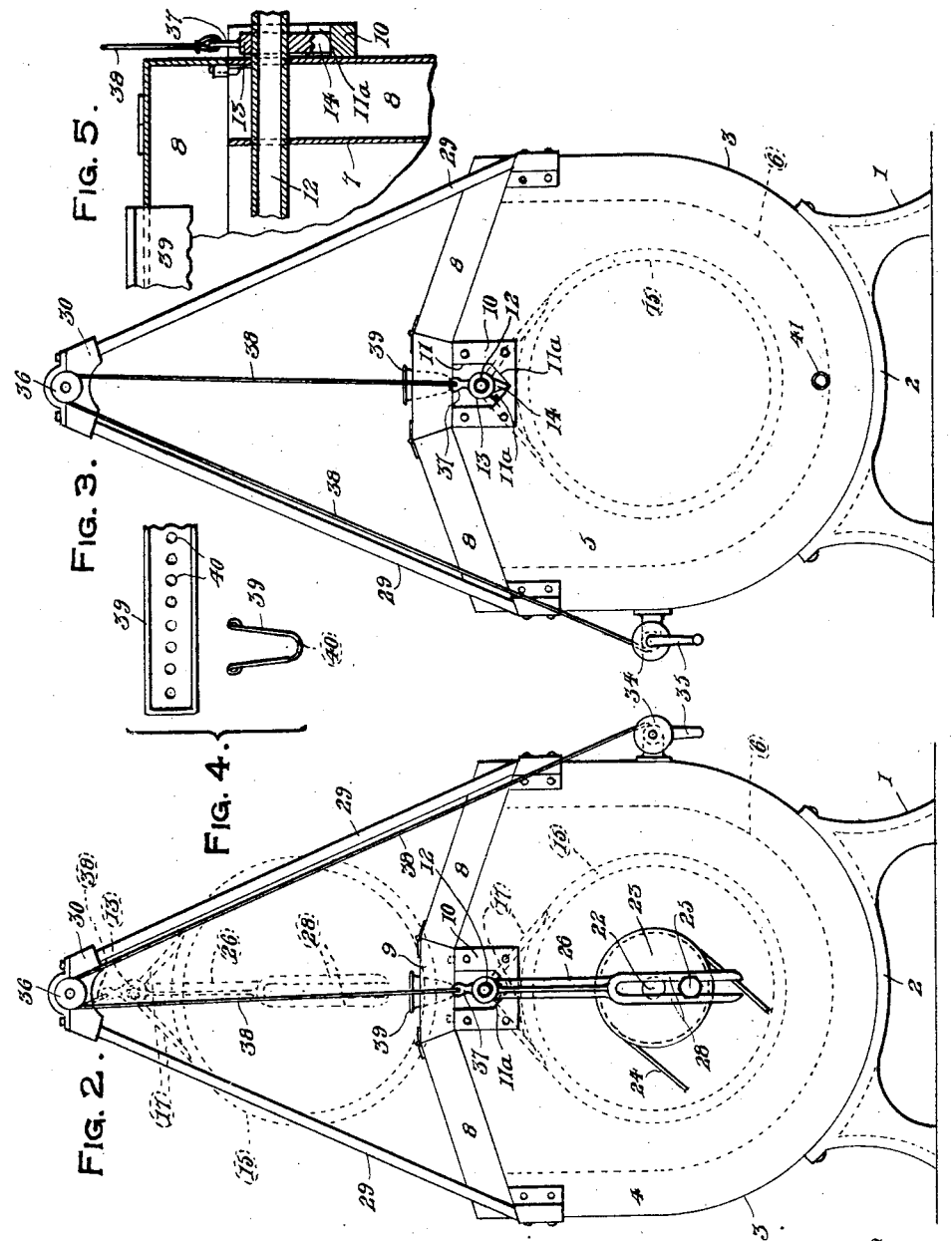

1,667,551

UNITED STATES PATENT OFFICE.

JOHN BENJAMINE HINSHAW, OF TOPEKA, KANSAS.

ANTIFRICTION AGITATOR.

Application filed September 24, 1924. Serial No. 739,593.

This invention relates to an anti-friction agitator for temperature regulating vats and is especially designed for dairy use, and also in other connections where it is desired to raise or lower the temperature of liquid.

The primary object of this invention is to provide an agitator and cooling medium for milk vats wherein a cooling device, preferably in the form of an elongated coil, is suspended within the vat and immersed in the milk in a manner to permit swinging movement thereof similar to the action of a pendulum, the bearing points for the swingingly mounted cooling coil being in the form of a knife edge for purposes of reducing friction and eliminating the use of the usual oiled bearing required for a rotatable agitator.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a side elevational view, partly broken away, of an anti-friction agitator constructed in accordance with the present invention showing the cooling coil rockingly suspended within the vat and the devices for elevating the coil from the vat, Figure 2 is an end elevational view of the device showing the cooling coil in dotted lines elevated above the vat and the mechanism for accomplishing swinging movement of the coil within the vat, Figure 3 is an opposite end elevational view of the device showing the anti-friction knife edge suspension for the cooling coil, Figure 4 shows a fragmentary top plan view and end elevation of the liquid or milk receiving trough for the vat, and Figure 5 is a fragmentary detail sectional view showing the bearings for the end of the coil positioned outwardly of each end of the vat.

In the general type of agitators and cooling devices for liquids, such as milk cooling vats, it has heretofore been customary to provide a rotatable agitator within a vat that has end bearings extending through the end walls of the vat that require lubrication, and oil and other foreign matter pass from the bearings into the vat and contaminate the liquid therein. In the present type of agitator and cooling device as disclosed in this application, the agitator is swingingly mounted within the vat for rocking movement and the bearings for the cooling device embody a knife edge suspension disposed outwardly of the vat and being of a nature not to require lubrication of any character. The apparatus embodies a double walled vat mounted upon supporting feet 1 of the type best illustrated in Figs. 2 and 3, the vat being of elongated and substantially semi-circular formation with the feet 1 and the connecting bridge 2 for the feet supporting the outer wall 3. End walls 4 and 5 connect the outer wall 3, while the inner substantially semi-circular elongated wall 6 is spaced from the outer wall 3 and connected by end walls 7 forming an intermediate air space 8 as shown in Fig. 5. The open upper side of the vat is closed by a cover formed of side sections 8 hinged to the central horizontal section 9 that completely covers the upper side of the vat.

A cooling device is suspended within the vat for swinging or rocking movement and includes a block 10 secured to the outer face of each end wall 4 and 5 at the upper edge thereof, the block having a socket 11 therein that opens at the upper edge thereof and terminating in a V-shaped pocket $11^a$ at the lower end as shown in Figs. 2 and 3. A horizontal pipe 12 extends longitudinally of the vat with the ends thereof projecting through the end walls and through the openings 11 in the blocks 10, a bearing 13 being secured to each end of the pipe outwardly of the adjacent end walls of the vat and carrying a depending knife edge 14 engaging the crotch of the pocket $11^a$. An elongated coiled pipe 15 has its ends 16 tapped into the pipe 12 adjacent the ends thereof at points spaced inwardly of the inner end walls 7 and said pipe coil 15 further communicates with the pipe 12 by the spaced pipe sections 17 as shown in Fig. 1. The coiled pipe 15 is further supported upon the pipe 12 by brackets 18 to provide a substantially rigid connection between the pipe 12 and the coiled pipe 15. The projecting ends of the pipe 12 are provided with elbow connections 19 to which flexible hose 20 are detachably connected as at 21. Either of the hose sections 20 may be the inlet or outlet and it will be seen that a cooling medium is caused to flow through the pipe 12 and coiled pipe 15 for cooling the liquid contents of the vat.

To accomplish swinging or rocking movement of the coiled pipe 15 within the vat and the supporting bearings 14 upon the blocks 10, end wall 4 of the vat is provided with a bearing 22 supported centrally and exteriorly thereof and upon which a belt wheel 23 is journaled, the belt 24 extending from a suitable source of power passing over the wheel 23 while an eccentric pin 25 projects outwardly of the pulley wheel 23 as shown in Figs. 1 and 2. A rocking arm 26 depends from a hub 27 that is fixed to the pipe 12 as shown in Fig. 1, the lower end of the arm 26 being bifurcated to provide side portions 28 that are spaced at their lower ends as shown in Fig. 2 with the eccentric pin 25 freely extending between the side portions of the rocker arm. It will therefore be seen that when the pulley wheel 23 is rotated, rocking or swinging movement is imparted to the rocker arm 26 which in turn swings the coiled pipe 15 within the vat in a manner similar to the action of a pendulum.

To facilitate cleaning the vat and the removal of the coiled pipe 15, a frame structure is superposed upon the vat and includes corner legs 29 secured at their lower ends to the upper side edges of the end walls 4 and 5, the legs 29 being inclined toward each other and secured to the lock 30 while a longitudinally extending rod 31 connects the blocks 30 at each end of the vat. A rod or shaft 32 extends longitudinally of the vat and is supported exteriorly thereof in bearings 33, a windlass 34 being secured to each end of the shaft 32 and positioned outwardly of the opposite end walls 4 and 5, the shaft being rotated through the medium of the hand crank 35. Each end of the rod 31 supports a pulley 36 outwardly of the supporting blocks 30 directly above an eye-bolt 37 carried by each bearing 13. Cables 38 anchored at one end to the windlasses 34 pass upwardly over the pulleys 36 and downwardly for connection to the eye-bolts 37 as shown in Figs. 2 and 3. Upon removing the cover to the vat and operating the shaft 32 by the crank handle 35, the cables 38 are wound upon the windlasses 34 with the pipe section 12 and the coiled pipe 15 elevated from the vat together with the rock arm 26, it being understood that the flexible hose 20 is to be disconnected from the elbow sections 19 at their connections 21. To facilitate filling the vat with the liquid to be agitated and cooled, the central horizontal cover section 9 is formed with an elongated opening to receive the trough 39 that has a series of perforations or openings 40 in the bottom wall thereof to cause an even distribution or supply of the liquid over the coiled pipe 15. The liquid is drained from the vat by the faucet 41 connected to the end wall as shown in Figs. 1 and 3.

From the above detail description of the apparatus, it is believed that the construction and operation thereof will at once be apparent, it being noted that by the provision of the swingingly mounted or rocking coiled pipe 15 to accomplish the agitation and cooling of the liquid within the vat, the former usual type of rotatable agitator is eliminated as well as objections thereto as the knife edge suspension for the coiled pipe does not require lubrication of any kind and in view of the nature thereof, friction is reduced to a minimum or practically eliminated. The same results possible with a rotatable agitator are accomplished by the present construction in a more efficient manner and with a reduced number of structural elements.

While there is herein shown and described the preferred embodiment of the present invention, it is nevertheless to be understood that minor changes may be made therein without departing from the spirit and scope of the invention as claimed.

What is claimed as new is:—

1. In combination, an open-top vat, a heat exchange agitating coil suspended within and supported by the ends of the vat for oscillation about a horizontal axis and freely removable from the vat upon elevation of the same, and oscillating means for the coil including actuating elements freely separable when the coil is elevated, said actuating elements embodying a rotatable eccentric pin at one end of the vat and a depending arm fixed to the axis of oscillation of the coil and having a longitudinally bifurcated lower end straddling said eccentric pin.

2. In combination, an open-top vat, a heat exchange agitating coil suspended within and supported by the ends of the vat for oscillation about a horizontal axis and freely removable from the vat upon elevation of the same, oscillating means for the coil including actuating elements freely separable when the coil is elevated, said coil including end pintle members having rigid depending knife edge bearing elements, and said ends of the vat having open-top sockets provided with V-shaped bottom portions in the crotches of which said bearing elements seat.

In testimony whereof I affix my signature.

JOHN BENJAMINE HINSHAW.